United States Patent [19]
Nelson

[11] Patent Number: 5,055,767
[45] Date of Patent: Oct. 8, 1991

[54] ANALOG MULTIPLIER IN THE FEEDBACK LOOP OF A SWITCHING REGULATOR

[75] Inventor: Carl T. Nelson, San Jose, Calif.

[73] Assignee: Linear Technology Corporation, Milpitas, Calif.

[21] Appl. No.: 546,103

[22] Filed: Jun. 29, 1990

[51] Int. Cl.$^5$ .............................................. G05F 1/575
[52] U.S. Cl. .................................... 323/285; 323/281
[58] Field of Search ............... 323/282, 283, 284, 285, 323/316

[56] References Cited

U.S. PATENT DOCUMENTS

| | | | |
|---|---|---|---|
| 4,247,789 | 1/1981 | Cate et al. | 328/144 |
| 4,301,497 | 11/1981 | Johari | 363/21 |
| 4,651,265 | 3/1987 | Stacey et al. | 363/35 |
| 4,731,722 | 3/1988 | Conroy | 363/207 |
| 4,837,495 | 6/1989 | Zansky | 323/285 |
| 4,940,929 | 7/1990 | Williams | 323/283 |

OTHER PUBLICATIONS

Data Sheet, Unitrode UC1854/2854/3854 High Power Factor Preregulator, Nov. 1989.
Data Sheet, LM194/LM394 Supermatch Pair, National Semiconductor Corp., 1982, Linear Databook, pp. 12–14.

Primary Examiner—Peter S. Wong
Assistant Examiner—Ben M. Davidson
Attorney, Agent, or Firm—Mark D. Rowland

[57] ABSTRACT

An analog multiplier feedforward technique for use in the feedback loop of a switching regulator circuit is provided. The analog multiplier eliminates the necessity for the output of the error amplifier to the regulator circuit to change voltage when regulator input voltage changes, and makes "loop" gain independent of input voltage.

10 Claims, 2 Drawing Sheets

ANALOG MULTIPLIER IN THE FEEDBACK LOOP OF A SWITCHING REGULATOR

BACKGROUND

Switching regulators, like all feedback systems, must be properly "compensated" to ensure that the feedback loop will not oscillate. Compensation is particularly difficult in switching regulators because the inductors and capacitors conventionally used (in an LC filter network) to convert the switching waveform to a steady DC output voltage cause large phase shifts in the forward part of the feedback loop. Also, the "gain" of the loop is often a function of DC input voltage. This can lead to instability problems or slow loop response if input voltage varies over a wide range.

Another problem with switching regulators is slow response to sudden changes in input voltage or load current. The regulator may have high DC gain which allows it to maintain a well-regulated output under wide variations of input voltage and load current, but if these variations occur rapidly, there will be large transient shifts in output voltage while the feedback loop attempts to correct the output error. The overall slow response is dictated by the response time of the above-mentioned LC filter network and by the requirement that the AC loop gain generally needs to be less than 0 dB (unity) at 1/10th or less of the switching frequency. A switching frequency of 100 KHz therefore will require a unity gain frequency of 10 KHz or less.

Linear regulators, in contrast, may have unity gain frequencies in the range of several hundred kilohertz to several megahertz. They respond quickly to fluctuating line or load conditions. However, linear regulators are generally not as efficient as switching regulators.

To achieve better response times to input fluctuations, prior art switching regulator circuits have used what is known as "feedforward" correction. The principle of these circuits is to add an output correcting signal to the forward part of the loop. This signal is proportional to input voltage and is designed to cause a shift in output voltage equal, but opposite to that caused by the change in regulator input voltage. This correcting signal has fast response because it does not have to pass through the slow "feedback" part of the overall regulator loop. One way to accomplish this feedforward function is to make the oscillator amplitude be a function of input voltage. Because this causes the frequency to vary inversely with input voltage, oscillator charging current also needs to be a function of input voltage to maintain constant switching frequency. Various other schemes have also been devised to insert a feedforward signal. However, these feedforward schemes suffer drawbacks. Problems encountered with these other prior art schemes include: inaccurate compensation, narrow range of allowable input voltage, and jitter in switching frequency.

In view of the foregoing, it would be desirable to be able to provide feedforward output correction in a switching regulator circuit in a manner that allows accurate compensation and a broad range of allowable input voltages, and that does not create jitter in the switching frequency.

SUMMARY OF THE INVENTION

It is an object of the present invention to provide a feedforward method for use in a switching regulator circuit that is accurate and that does not limit input voltage or affect switching frequency. This and other objects of the invention are accomplished by a switching regulator circuit which uses an analog multiplier circuit interposed between the error amplifier and duty cycle modulator circuits of the regulator.

The generalized formula for the output ($V_M$) of the multiplier is $V_M = X*Y/Z$, where X, Y and Z are the three input "ports" of the multiplier. To achieve the proper feedforward function in a buck mode switching regulator, the X and Y ports are connected respectively to the output of the error amplifier and a stable reference signal source (voltage or current), and the Z port is connected to the regulator input voltage. The analog multiplier eliminates the necessity for the error amplifier output to change voltage when regulator input voltage changes, and makes loop "gain" independent of input voltage.

DETAILED DESCRIPTION OF THE INVENTION

Figure 1:
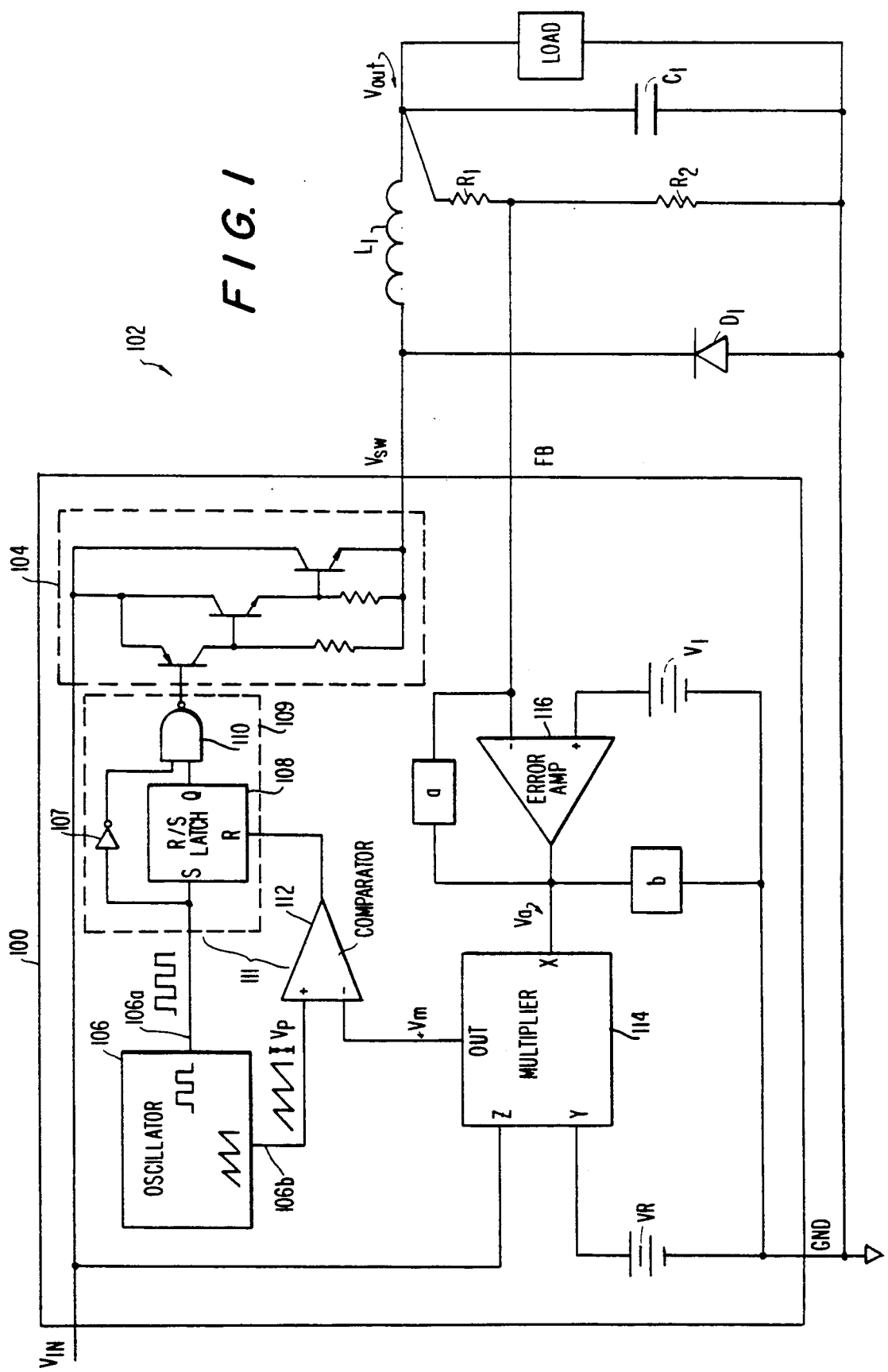
FIG. 1 a block diagram of a switching regulator circuit including a monolithic integrated circuit switching regulator device incorporating an exemplary embodiment of the analog multiplier feedforward method and circuit of the present invention.

Referring to FIG. 1, there is shown a block diagram of a monolithic integrated circuit switching regulator device 100 connected with discrete components in a positive buck mode switching regulator circuit 102. The block diagram of device 100 is simplified for purposes of illustration of the present invention, and may include terminals and circuitry other than what is shown in FIG. 1. For example, although not shown in FIG. 1, device 100 preferably includes one or more terminals and circuitry for implementing various functions such as frequency compensation, current limiting, soft-start operation and shutdown. Further, various circuit functions included in device 100 may be implemented alternatively using discrete components (e.g., an external switch or error amplifier may be used).

In FIG. 1, four terminals of device 100 are shown, including an input supply terminal ($V_{IN}$), a switch output terminal ($V_{SW}$), a feedback terminal (FB) and a ground terminal (GND). Terminal $V_{IN}$ provides a connecting point for input voltage, and is used to supply power to the internal circuitry of device 100. Terminal $V_{SW}$ is the output terminal of device 100. It provides a connecting point between switch 104 of device 100 and external components configured to implement a switching regulator topology for converting the pulsed current flowing through switch 104 into a regulated output voltage $V_{OUT}$. Terminal FB serves as an input for feedback voltage, and terminal GND provides a point for connecting the internal circuitry of device 100 to an external ground.

In regulator circuit 102, device 100 is connected via terminals $V_{SW}$, FB and GND to external resistors $R_1$ and $R_2$, capacitor $C_1$, diode $D_1$ and inductor $L_1$. As previously stated, regulator circuit 102 is configured in a typical positive buck mode regulator implementation. The buck regulator provides a regulated output voltage $V_{OUT}$ which is lower than the voltage applied at terminal $V_{IN}$. Regulator circuit 102 works as follows.

Switch 104, comprising a Darlington NPN transistor driven by a saturated PNP transistor, opens and closes with a frequency set by oscillator circuit 106. A switch cycle is initiated by the oscillator setting R/S latch circuit 108 of duty cycle control logic circuitry 109. For this purpose, oscillator 106 provides a pulsed waveform 106a to the set input S of R/S latch 108. The switching frequency of switch 104 is equal to the pulse frequency of waveform 106a. In addition to setting R/S latch 108, each pulse also locks out switch 104 for the duration of the pulse via inverter 109 and AND gate 110. This allows time for a finite switch off-time if desired.

Switch 104 is turned off by conventional comparator circuit 112. Comparator circuit 112, along with duty cycle control logic circuitry 109, comprise the duty cycle modulation circuit 111 of device 100. The output of comparator circuit 112 resets latch 108 when the voltage level at its non-inverting input (+) exceeds a threshold voltage set by the voltage level at its inverting input (−). The non-inverting input of comparator 112 is connected to a second output of oscillator circuit 106, which provides at the second output a sawtooth waveform 106b synchronized with the pulsed waveform 106a. Waveform 106b has a peak to peak magnitude $V_P$. The inverting input of comparator 112 is connected to the output (OUT) of multiplier circuit 114, which provides a threshold signal $V_M$ to the comparator.

The ratio of switch "on" time to "off" time (duty cycle) is determined by the voltage $V_M$ at the inverting input of comparator 112. When $V_M$ is at a voltage level close to the low point of oscillator output waveform 106b, duty cycle (DC) is near zero, and when $V_M$ is near the upper voltage level of waveform 106b, duty cycle approaches 1.0 (100%).

Output voltage of regulator circuit 102 is determined by input voltage and duty cycle as follows: $V_{OUT} = (DC)(V_{IN})$. The waveform at terminal $V_{SW}$ switches between $V_{IN}$ and zero. It is approximately equal to $V_{IN}$ when switch 104 is closed, and approximately zero when the switch is open. Inductor $L_1$ and capacitor $C_1$ filter this rectangular switching waveform to a relatively smooth DC output voltage.

To maintain a constant DC output voltage $V_{OUT}$, error amplifier circuit 116 in device 100 senses a voltage proportional to the regulated output voltage which is applied to terminal FB by the resistor divider network formed by resistors $R_1$ and $R_2$. Error amplifier 116 compares this proportional feedback voltage to a stable reference voltage $V_1$. Any error in output voltage will be amplified by error amplifier 116 and fed to comparator 112 via multiplier 114 to adjust the duty cycle of switch 104. Error amplifier 116 is a conventional amplifier circuit having a high gain. As a result of this high gain, the regulator output will be controlled to a precise value determined by $V_1$, $R_1$, and $R_2$. Networks a and b in device 100 are conventional resistor/capacitor combinations used to reduce the gain of the error amplifier at higher frequencies to ensure a stable feedback loop.

A mathematical analysis of the feedback loop of regulator circuit 102 loop shows that the voltage required at the inverting input of comparator 112 is equal to:

$$V_M = \frac{V_P \cdot V_{OUT}}{V_{IN}},$$

where $V_P$ is the peak-to-peak voltage of the ramped oscillator output waveform 106b. If $V_{IN}$ changes from a lower voltage value ($V_L$) to a higher voltage value ($V_H$), $V_M$ must change by an amount equal to:

$$\Delta V_M = V_P \cdot V_{OUT} \frac{(V_H - V_L)}{(V_H \cdot V_L)}$$

Without multiplier circuit 114, error amplifier 116 will adjust $V_M$ to the necessary value to maintain a constant output, but because the error amplifier is "slowed down" at high frequencies by networks a and b, this corrective action takes a relatively long time. During this time, the regulator output can deviate by a relatively large amount from its intended value.

The function of multiplier 114 is to eliminate the necessity for the error amplifier output to change voltage when regulator input voltage changes. The output of the multiplier ($V_M$) is equal to $$\frac{V_a \cdot V_R}{V_{IN}}.$$

Since the required $V_M$ is equal to $$\frac{V_P \cdot V_{OUT}}{V_{IN}},$$

then a simple algebraic manipulation shows that $V_a$ is equal to:

$$V_a = \frac{V_P \cdot V_{OUT}}{V_R}.$$

Note that the required $V_a$ is now independent of input voltage $V_{IN}$. Variations in input voltage are immediately translated by multiplier 114 to a value of $V_M$ which maintains a constant output voltage. The speed and accuracy of this multiplier feedforward technique is maintained over any input voltage range. It does not affect switching frequency.

The multiplier performs a second desirable function in that it makes loop "gain" independent of input voltage. The relationship of $V_{OUT}$ to $V_P$, $V_M$, and $V_{IN}$ is:

$$V_{OUT} = \frac{V_M \cdot V_{IN}}{V_P}$$

The "gain" from $V_M$ to $V_{OUT}$ is found by differentiating this expression with respect to $V_M$:

$$\frac{dV_{OUT}}{dV_M} = \frac{V_{IN}}{V_P}$$

This shows that loop gain is directly proportional to input voltage in a conventional circuit with no multiplier. The frequency compensation networks must be designed to ensure loop stability at highest $V_{IN}$, and therefore are "overdesigned" at low input voltage. This makes the loop very slow at low input voltage, exacerbating the transient response problem.

Adding the multiplier introduces a gain term which cancels the variation in gain from $V_M$ to $V_{OUT}$, as shown by the series of equations below:

$$V_M = \frac{V_a * V_R}{V_{IN}}$$

$$\frac{dV_M}{dV_a} = \frac{V_R}{V_{IN}}$$

$$\frac{dV_{OUT}}{dV_a} = \frac{(dV_{OUT})}{(dV_M)} \frac{(dV_M)}{(dV_a)} = \frac{(V_{IN})}{(V_P)} \frac{(V_R)}{(V_{IN})} = \frac{V_R}{V_P}$$

As can be seen, loop gain is now independent of input voltage.

Other topologies of switching regulator circuits can be easily implemented using the analog multiplier feedforward technique of the present invention. It may be required in such other topologies that different inputs to the multiplier be used. For example, it is preferable that, in a positive to negative converter (or a negative to positive converter), the "Z" input of the multiplier be equal to $V_{IN} + V_{OUT}$ instead of $V_{IN}$. This is easily accomplished with a summing network.

As should be apparent to one of skill in the art, the multiplier technique of the present invention provides a general solution to transient and loop gain problems in all switching regulators.

Figure 2:
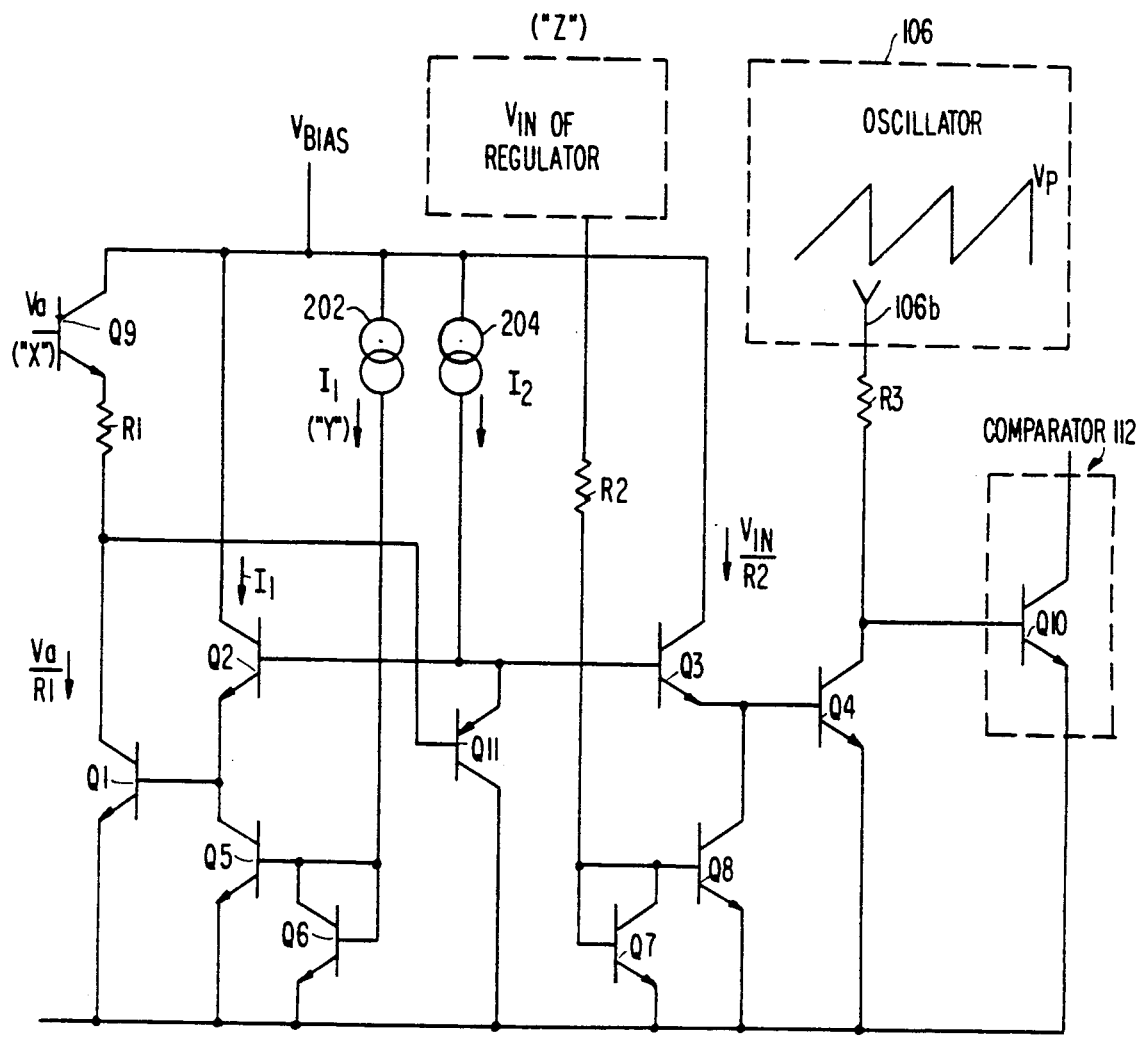
FIG. 2 is a schematic diagram of an exemplary embodiment of the circuitry of the analog multiplier and comparator components of the monolithic integrated circuit switching regulator device of FIG. 1.

FIG. 2 shows a schematic of a preferred circuit for implementing analog multiplier 114 in a bipolar integrated circuit device. Multiplier 114 is implemented in FIG. 2 as a single quadrant (all inputs and output are positive) current-based multiplier circuit. Other conventionally designed current-based or voltage-based (such as is shown generally in FIG. 1) analog multiplier circuits may be used to implement multiplier 114.

Transistors Q1 through Q4 operate as the multiplier core. The "X" input to the multiplier is $V_a$ (the output of error amplifier 116), which generates a current through resistor R1 of magnitude $V_a/R1$. For purposes of the discussion herein of the operation of the circuit of FIG. 2, transistor base currents and base-emitter voltages are ignored.

The "Y" input is a reference current $I_1$. Current source 202 conducts current $I_1$ to current mirror Q5/Q6, which sets the current through transistor Q2 equal to $I_1$. The "Z" input is $V_{IN}$ (from $V_{IN}$ terminal of device 100). $V_{IN}$ is fed through resistor R2 and current mirror Q7/Q8 to set the current in transistor Q3 equal to $V_{IN}/R2$.

The output of multiplier 114 is the current in transistor Q4. This current is calculated to be:

$$I_c(Q4) = \frac{[I_c(Q1)][I_c(Q2)]}{I_c(Q3)} = \frac{(V_a/R1)(I1)}{(V_{IN}/R2)} = \frac{R2}{R1} * \frac{(V_a)(I1)}{V_{IN}}$$

The oscillator voltage waveform 106b is fed to resistor R3 which conducts current to transistors Q4 and Q10. Transistor Q4 current subtracts from this signal to set the base voltage of transistor Q10. Transistor Q10 comprises comparator 112. The collector voltage output of transistor Q10 will be an approximate square wave with a duty cycle (DC) approximately equal to:

$$\frac{V_P - I_c(Q4)(R3)}{V_P}.$$

Current source 204 provides a bias current $I_2$ for transistors Q2 and Q3. Bias voltage is supplied to the overall multiplier circuit from the input voltage supplied at terminal $V_{IN}$. Transistor Q11 acts as a current amplifier to isolate I2 bias current from transistor Q1.

Thus an analog multiplier feedforward technique for use in a switching regulator circuit has been described. One skilled in the art will appreciate that the present invention can be practiced by other than the described embodiments, which are presented for purpose of illustration and not of limitation, and the present invention is limited only by the claims which follow.

What is claimed is:

1. In an integrated circuit for use in implementing a feed back loop in a switching voltage regulator circuit, the switching voltage regulator circuit including an input for connection to a source of input voltage for the switching voltage regulator circuit, a current switching means, oscillator means for controlling the one and off switching frequency of the current switching means, and further including error amplifier means in the feedback loop, the integrated circuit comprising:

analog multiplier means for providing a signal to control the on and off switching duty cycle of the current switching means, the signal having a magnitude which varies immediately with and substantially in proportion to changes in a value equal to the magnitude of an error signal from the error amplifier means divided by the magnitude of the input voltage of the switching voltage regulator circuit.

2. The integrated circuit of claim 1, wherein the analog multiplier means comprises a circuit that multiplies the error signal by a reference value and divides the product of the reference value and the error signal by the input voltage.

3. The integrated circuit of claim 2, wherein the reference value comprises the magnitude of a reference current conducted by the analog multiplier circuit.

4. The integrated circuit of claim 3, wherein the switching regulator circuit includes a comparator circuit comprising a transistor having a base coupled to the oscillator means and the analog multiplier circuit, and wherein the comparator circuit transistor, the oscillator means and the analog multiplier circuit are coupled to a common circuit node.

5. The integrated circuit of claim 4, wherein the reference signal from the oscillator means comprises a ramped voltage signal coupled to the common circuit node and the analog multiplier circuit subtracts from the ramped voltage signal to set the base voltage of the comparator circuit transistor.

6. In an integrated circuit for use in a switching voltage regulator circuit, the switching voltage regulator circuit having an input for connection to a source of input voltage for the switching voltage regulator circuit, and providing a regulated output voltage at a regulator output terminal, the integrated circuit including:

a switching transistor;

an input terminal for accepting an input voltage for the integrated circuit;

an error amplifier means for accepting a feedback signal from the output of the switching voltage regulator circuit and for providing at an error amplifier output an error signal indicative of changes in the feedback signal relative to a reference value;

control means coupled to the error amplifier output and to the switching transistor and responsive to the error signal for varying the on and off switching duty cycle of the switching transistor, the control means including a feedforward compensation circuit capable of inversely varying the switching duty cycle in immediate response to a change in the switching regulator circuit input voltage, the feedforward compensation circuit comprising:

an analog multiplier circuit having an output coupled to the control means for providing a control signal to control the switching duty cycle of the switching transistor, a first input coupled to the error amplifier output and a second input coupled to the input terminal of the integrated circuit, the analog multiplier circuit providing at its output a control signal which varies in substantial proportion to changes in a quotient resulting from the division of the error signal provided at the output of the error amplifier by the voltage at the input terminal of the integrated circuit.

7. The analog multiplier circuit of claim 6, wherein the first input comprises a transistor having its base coupled to the error amplifier output such that the collector-emitter circuit of the transistor conducts a current proportional to a voltage signal at the error amplifier output.

8. The analog multiplier circuit of claim 7, wherein the second input comprises a resistor coupled on one end to the input terminal of the integrated circuit and on the other end to a current mirror circuit.

9. The analog multiplier circuit of claim 8, wherein the current mirror circuit is coupled to the base of a transistor, the collector of the transistor comprising the output of the analog multiplier circuit.

10. A method for providing feedforward compensation in the feedback loop of a switching regulator circuit, the feedback loop including an error amplifier means for providing an amplified error signal to modulate the switching regulator duty cycle, the method comprising the step of:

dividing the amplified error signal by the input voltage of the switching regulator circuit to provide a signal for inversely varying the switching duty cycle in instantaneous response to a change in the switching regulator circuit input voltage, whereby the switching regulator circuit is capable of maintaining a substantially constant output voltage without requiring the error signal output of the error amplifier means to vary in response to a change in switching regulator circuit input voltage, and whereby gain of the feedback loop is made independent of the switching regulator circuit input voltage.

* * * * *